July 21, 1964 A. B. KAUFMAN ETAL 3,142,044
CERAMIC MEMORY ELEMENT
Filed May 17, 1961

INVENTORS
Alvin B. Kaufman
Leon H. Steinman
By Richard K. Ehrlich
Attorney

United States Patent Office 3,142,044

Patented July 21, 1964

3,142,044

CERAMIC MEMORY ELEMENT

Alvin B. Kaufman, Woodland Hills, and Leon H. Steinman, Thousand Oaks, Calif., assignors to Litton Systems, Inc., Beverly Hills, Calif.

Filed May 17, 1961, Ser. No. 110,749
9 Claims. (Cl. 340—173.2)

The present invention relates to a non-destructive ceramic memory and more particularly to a non-destructive ceramic memory capable of generating relatively high voltage output signals which can be gated directly without amplification.

As is well known to those skilled in the art, there is a great demand in the computer field, as well as in other related fields, for a relatively inexpensive, non-destructive random access memory element. In the prior art, probably the most widely used random access memory element is the conventional ferromagnetic core element. However, the mechanization of a ferromagnetic core element requires that a number of fine wire windings be wound thereon. Hence, mechanization of magnetic memory cores is not subject to mass production techniques. Accordingly, magnetic core memories are expensive to produce.

In addition, the ferromagnetic core element is a destructive readout device so that support circuitry of some type must be provided to reset each core element subsequent to readout so that it can operate in a non-destructive manner. Furthermore, ferromagnetic core elements generate relatively low voltage outputs. For example, the output signal from a conventional core is in millivolts. Accordingly, the output signal from a core memory device cannot be used to directly drive computer gating circuitry but must be amplified first by means of additional amplifier circuitry. It should also be noted that ferromagnetic core memories are sensitive to stray magnetic flux fields as well as to nuclear radiation. Therefore, magnetic core memories are limited to applications where the memory is not exposed to stray magnetic fields or to any type of nuclear radiation.

In order to overcome the limitations inherent in the use of ferromagnetic cores and in other types of magnetic memories, considerable attention has been directed to ceramic memory devices. In particular, considerable effort has gone into research and development of a ceramic memory element utilizing the electrostrictive, piezoelectric and ferroelectric effects inherent in many of these materials. Of the many types of ceramic ferroelectric devices investigated, the most promising appeared to be a two piece motor memory device. In this type memory, two different ceramic slabs are physically interconnected, one piece being fabricated from a ceramic having good electrostrictive properties and being permanently polarized to one or the other of its bipolar levels so that it is operable as a motor element and the other piece being fabricated from a ceramic having good ferroelectric properties and being free to assume either one of its bipolar levels so that it is operable as a memory element.

In operation, the motor element is, in accordance with the electrostrictive effect, physically deformed by the application of an electric field across the motor element, the physical deformation being transmitted to the memory element by the interconnection of the two elements. The memory element is, in accordance with the ferroelectric effect, responsive to the mechanical stress or deformation transmitted thereto to produce an electrical potential whose polarity is representative of the state of polarization of the bipolar memory element. Accordingly, by positioning a pair of conductive plates on opposite sides of the memory element when the physical deformation is transmitted thereto, the memory element can be polarized in accordance with the polarity of an information signal applied to the plates and the signal can be reproduced at any later time by applying an electric field across the motor element.

While the ceramic material used in the motor element slab is chosen especially to produce the maximum physical distortion in response to the applied electric field and the ceramic used in the memory slab is chosen to generate the maximum magnitude electric field in response to the applied physical deformation, the maximum obtainable readout voltages have been only of the order of 5 to 75 millivolts. Accordingly, the prior art ceramic memory element is limited in amplification in the same manner as ferromagnetic memories in that extremely small output signals are produced.

Accordingly, additional amplification circuitry must be utilized in connection with the prior art ceramic memory element before the output signals are capable of driving computer gating circuitry. In operations where size and weight and reliability are extremely important, such as airborne applications, the addition of such circuitry increases the complexity of the overall circuitry and hence reduces the reliability of the system on the one hand and increases the size and weight of the system on the other.

In addition, the prior art two piece memory has proved to be quite difficult and expensive to fabricate because of the joining or bonding of the two ceramic pieces so that it, too, is not subject to mass production techniques.

The present invention overcomes the foregoing and other limitations of the prior art by providing a non-destructive ferroelectric memory element which is easy to manufacture and capable of generating output signals in the 1 to 10 volt range. Accordingly, the output from the ferroelectric memory element of the invention can be applied directly to computer gating circuitry.

In accordance with the present invention, a single slab or piece of ceramic material having both electrostrictive and ferroelectric properties is utilized as both the memory and motor elements of the memory. More particularly, a portion of the single monomorphic slab of the ceramic material is permanently polarized without affecting the remainder of the slab whereby the permanently polarized portion is capable of functioning as the motor element and the other portion of the slab is capable of functioning as the memory element.

Accordingly, application of an excitation signal to a pair of conductive plates positioned on opposite sides of the motor portion will result in physical deformation of the memory element so that an output signal, representative of the polarity of the memory portion, will be generated on a pair of conductive surfaces positioned adjacent opposite sides of the memory portion, the memory portion being previously polarized by an information signal in accordance with the value of the information signal.

Continuing with the discussion of the invention, it should be noted that ceramic materials having both electrostrictive and ferroelectric properties do not possess either good electrostrictive or good ferroelectric properties. Accordingly, it would be expected that the magnitude of the output signal generated by the memeory element of the invention would be of substantially less amplitude than the prior art two piece memories.

However, it has been found that, on the contrary, the one piece memory of the present invention, in addition to being much simpler to fabricate, produces an output signal having a magnitude many times greater than that of the prior art devices. From a theoretical point of view, this substantial improvement in magnitude is due to the fact that the poor electrostrictive and ferroelectric response of the dual use ceramic material is more than overcome by the tight mechanical coupling of the motor and memory portions resulting from the single piece construction of the invention.

In accordance with the invention, the motor portion is permanently polarized, without affecting the memory portion, by heating the motor portion above its Curie temperature and applying an electric field across only the motor portion. Accordingly, upon application of an excitation or actuating signal to the conductive surfaces, the motor portion of the ferroelectric material is physically deformed by the electric field. However, because of the monomorphic unit structure of the ceramic element substantially the full magnitude of the physical distortion experienced by the motor portion is transmitted to and experienced by the memory portion of ferroelectric element. Accordingly, an electric field is generated across the memory portion, the polarity of the field being determined by the polarization of the ferroelectric material.

In accordance with one embodiment of the invention, a single monomorphic rectangular bar of barium titanate is divided into a motor portion and a memory portion by permanently polarizing the motor portion and by providing conductive surfaces on opposite sides of the memory portion as well as the motor portion. An excitation signal generator is connected to the surfaces adjacent the motor portion whereby an excitation voltage is selectively applied to the conductive surfaces. When, prior to the application of the excitation signal, the memory portion is polarized in one direction or the other by the application of an information signal to the conductive surfaces positioned adjacent the memory portion of the material, the information signal is reproduced each time the excitation voltage is applied.

In accordance with the invention, the excitation signal can either take the form of a pulse or a varying magnitude signal such as a sinusoid. If the excitation signal is sinusoidal, the output signal will be sinusoidal, the phasing of the signal indicating the value of the stored information. If the output signal is in the form of a pulse, the output signal will also be a pulse signal, the polarity of the pulse indicating the value of the stored information.

In accordance with another embodiment of the invention, a word length ferroelectric memory cell can be mechanized because of the good transmission deformation properties of the single piece ceramic memory element by adding to the memory portion additional information conductive surfaces in sequence down the length of the memory element. In accordance with the invention, the mechanical distortion or physical deformation caused by the motor pulse travels down the memory strip exciting the memory portions of the element and producing output signals representative of the information stored in the memory cells. Accordingly, a complete word readout can be accomplished with but a single memory element.

It is, therefore, an object to the present invention to provide a one piece non-destructive ceramic memory element.

It is another object of the present invention to provide a memory element capable of generating output signals of sufficient voltage magnitude to be applied directly to gating circuitry.

It is a further object of the present invention to provide a ferroelectric memory element which is not affected by the application thereto of stray magnetic fields or nuclear radiation fields.

It is a still further objective of the present invention to provide a relatively simple ceramic memory capable of storing a plurality of bits of information which can be readout upon the application of a single excitation signal.

It is still another further object to the present invention to provide a method of producing a one piece non-destructive ceramic memory element.

The novel features, which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration description only, and are not intended as a definition of the limits of the invention.

Figure 1:
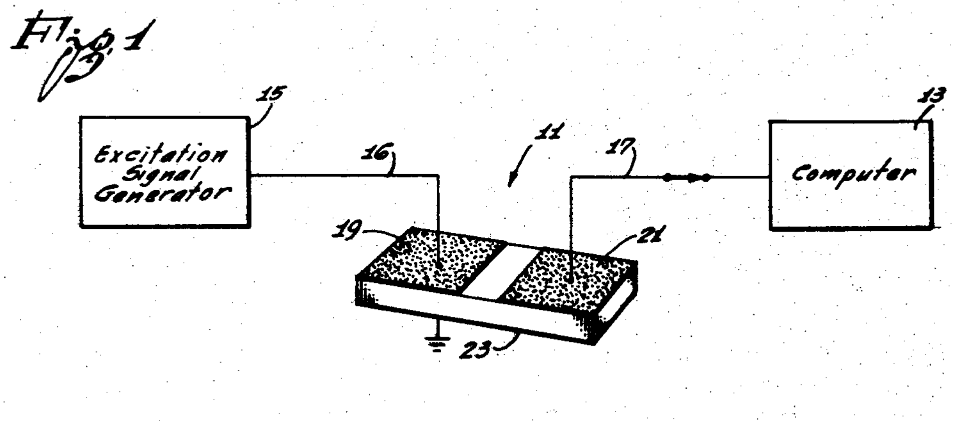
FIG. 1 is a view of the ceramic memory element of the invention with associated circuitry.

Referring now to the drawings, wherein like or corresponding parts are designated by the same reference characters throughout several views, there is shown in FIG. 1 a ferroelectric ceramic memory element 11 operable under the control of an excitation signal from an excitation signal generator 15 to produce information signals for application to a computer 13 which are representative of bits of information previously received from computer 13.

Referring to the operation of the memory element in more detail, a bipolar memory portion of memory element 11 is selectively driven to one or the other of its polarization levels by an information signal generated by computer 13 and applied to the memory over a conductor 17. Memory element 11 is excited by the excitation signal from generator 15 to reproduce the information signal on conductor 17 without changing the polarity of the memory portion and effecting the information stored therein. Accordingly, the memory element is capable of reproducing information stored therein without destroying the stored information so that the stored information can be reproduced an unlimited number of times.

As will be hereinafter explained, the operation of the memory element or cell is dependent upon three basic properties of ferroelectric ceramic materials. The first property is commonly known as the electrostrictive effect. In accordance with this effect, the material is physically deformed in accordance with the polarity of an electric field placed across the element if the material is in a polarized state. Conversely, if a mechanical stress is applied to a polarized ferroelectric material, an electrical output potential is observed across the material which is representative of the polarity of the material. This effect is known as the ferroelectric effect. The third and most important property possessed by ferroelectric ceramic materials is their ability to retain their state of polarization even after the external polarizing excitation is removed.

Referring now to the structure of the memory element, as shown in FIG. 1, the memory element is divided into two portions, hereinafter referred to as the motor portion and the memory portion, by a plurality of three conductive surfaces 19, 21 and 23, conductive surfaces 19 and 21 covering portions of one side of element 11 while conductive surface 23 covers the opposite side of the element. The motor portion of memory element 11 is defined as the portion of the memory element adjacent conductive surface 19 while the memory portion is defined as the portion of the memory element adjacent conductive surface 21. In accordance with the invention, the motor portion of the ferroelectric material is permanently polarized to one or the other of its bipolar levels by a process that will be hereinafter explained while the memory portion of the ferroelectric material is left free to exist in either one of its bipolar levels.

Continuing with the discussion of the invention, if the excitation signal from generator 15 is applied over conductor 16 to surface 19, it is clear that an electric field will be generated between surfaces 19 and 23 and thus across the previously permanently polarized motor portion of the element. In accordance with the electrostrictive effect, the motor element will experience physical deformation as a result of the electric field. However, because of the tight physical coupling of the single monomorphic slab, almost the full magnitude of the physical deformation will be transmitted to the memory portion of the memory element so that the memory portion will also experience substantial deformation. Thus, in accordance with the ferroelectric effect, an electrical potential will be generated between surfaces 21 and 23, if the memory element is polarized. Furthermore, the polarity of the potential will be representative of the state of polarization of the memory element.

Accordingly, if the memory element is, previous to excitation, polarized by application of an information signal from the gating circuitry of computer 13, the information signal will be effectively reproduced on conductor 17 upon generation of the excitation signal from generator 15. Furthermore, it should be noted that since the ferroelectric material remains in the same state of polarization after excitation, the memory information is not destroyed during readout but remains in the memory until such time as a subsequent information signal is read into the memory portion and the polarization of the memory portion is changed accordingly.

Continuing, it should be noted that the memory element can be excited either by a pulse signal or by a continuously varying magnitude signal, such as a sinusoidal signal. The form of the output signal produced on conductor 17 is dependent, of course, on the form of the excitation signal. For example, if generator 15 is a pulse generator, as shown in FIG. 1, the output signal will be a pulse signal with the polarity of the pulse representing the value of the stored information. On the other hand, if the generator 15 is a sinewave generator, the ferroelectric material of the memory element will expand and contract at the excitation signal frequency. Accordingly, the output signal will also be a sinusoidal signal. However, the output signal will be in phase or 180 degrees out of phase depending upon the polarity of the memory portion of the element.

The ferroelectric ceramic slab of the memory element can be fabricated from any of the numerous commercially available ferroelectric ceramic aggregates which exhibit both electrostrictive and ferroelectric properties. For example, many of the various polycrystalline aggregates of barium titanate with impurities have been found quite suitable for this purpose. In this regard, batches of commercially available barium titanate aggregates with various impurity combinations have been used in making the memory elements of the invention. One such batch, labeled batch 1055–29, obtained from the Electronics Equipment Division of Mullenbach Electric was used to produce slabs of ferroelectric ceramic material and the memory elements fabricated therefrom were tested. The test results disclosed the memory elements capable of generating output signals having magnitudes up to 5 volts measuring peak to peak when excited with a sinusoidal excitation signal 8 volts R.M.S.

In addition, the output impedance of the memory portion of the element was found to be approximately 1000 ohms. Accordingly, the memory element output impedance as well as the voltage of the output signal was such that the gating circuits of computer 15 could be directly driven with the signals. Hence, the amplification and impedance matching circuitry required in magnetic type memory devices need not be utilized with the memory of the present invention.

Figure 2:
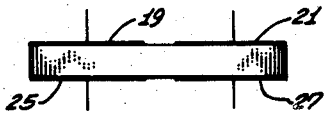
FIG. 2 is a view of a modified ceramic memory element of the invention.

Continuing with the discussion of the invention, it should be noted that the ferroelectric memory elements of the invention can be interconnected to form matrix memories in substantially the same manner as ferromagnetic memory elements are so arranged in the prior art. There is shown in FIG. 2 a memory element of the type disclosed in FIG. 1 but modified in that the common conductive plate 23 of FIG. 1 has been replaced by a pair of conductive plates 25 and 27 which are in register with conductive plates 19 and 21, respectively. This arrangement permits the complete separation of the excitation signal and the information signals thereby facilitating the use of the memory element in a memory matrix.

Figure 3:
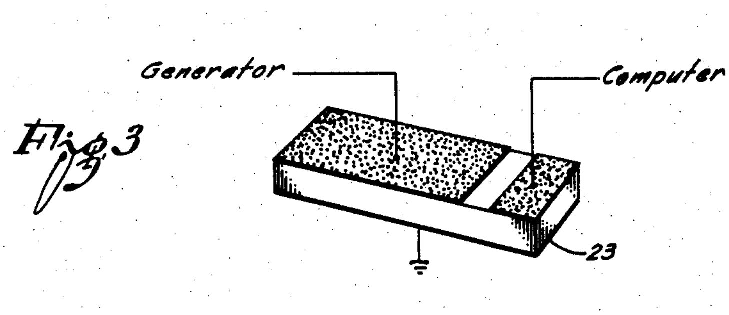
FIG. 3 is another embodiment of the ceramic memory element of the invention.

While the memory elements shown in FIGS. 1 and 2 have equal size motor and memory portions, it should be noted that the memory of the present invention need not be so limited. For example, there is shown in FIG. 3 a memory element having a motor portion approximately twice the size of the memory portion. Accordingly, it should be expressly noted that in accordance with the invention, the relative size of the motor and memory elements is not limited to any specific ratio.

Furthermore, numerous other variations and alterations of the memory element of the invention are possible without departing from the scope of the invention. For example, the memory element of the invention can be modified in such a manner that it is capable of storing and reading out a plurality of information bits under the control of a single excitation signal.

Figure 4:
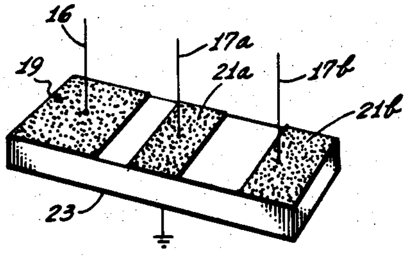
FIG. 4 is a ceramic memory element of the invention capable of storing two individual bits of information.

There is shown in FIG. 4 another embodiment of the ferroelectric memory element of the invention wherein two bits of information rather than one can be stored in the memory element. As shown in FIG. 4, a single piece of monomorphic ferroelectric ceramic material is divided into a motor portion and into two memory portions by a pair of conductive surfaces 21*a* and 21*b*, conductive surface 19 being connected by conductor 16 to excitation signal generator 15 while a pair of conductors 17*a* and 17*b* connect conductive surfaces 21*a* and 21*b* to the gating circuits of computer 13.

The memory shown in FIG. 4 operates in substantially the same manner as previously described memory elements of the invention except that two bits of information can be stored in the memory element by appropriately polarizing the two memory portions of the memory element since the magnitude of the physical deformation is large enough to sufficiently excite two or more memory portions. Readout of the memory element is accomplished, of course, by application of the excitation signal to conductive surface 19. It should be noted, in this regard, that readout can be accomplished in either a serial or parallel manner. If parallel readout is required a ferroelectric ceramic material should be utilized which has a relatively high mechanical Q or, in other words, by a material having a relatively low average power loss per cycle of vibration. On the other hand, if serial readout is required, material having a relatively low mechanical Q or high power loss should be used so that the physical deformation moving down the titanate strip serially excites the sequentially arranged memory portions of the element and is substantially degenerated when it reaches the strip end so that it is not reflected back up the strip.

It should be noted in regard to the multiple bit storage element that while a two bit strip is shown in FIG. 4, any capacity storage element can be mechanized by simply increasing the length of the memory element and adding additional memory portions to the element. In this manner, a word storage memory element of any length can be mechanized and operated in such a fashion that the complete word can be readout by the application of a single excitation signal.

Furthermore, a memory element of the type shown in FIG. 4 can be operated as a logical element as well as a memory element. For example, by application of an excitation pulse to the motor portion, two output information pulses can be simultaneously produced from the two memory portions. If the two memory portions of the conductors are connected to a common terminal, an "and" logic function will be performed at the common terminal since if both cells contain the same valued information, a pulse will be readout while if the cells contained oppositely valued information, the information signals from the two memory portions will cancel.

In addition to the numerous advantages of the present invention hereinbefore discussed, it should be noted that the memory element has the additional operating advantage that its operation is unaffected by exposure to magnetic fields or nuclear radiation. In this regard, it should be noted that ceramic memory elements of the present invention have been exposed to integrated dosages of $1.5 \times 10^{16}$ neutrons per square centimeter at energies greater than 2.9 mev. accompanied by $8 \times 10^{10}$ ergs per gram of gamma radiation. The operation of the memory element was tested after radiation and was found to be unaffected.

Referring now to one satisfactory method of producing a memory element of the present invention, a single slab of barium titanate ceramic of the type hereinbefore described is diced to form numerous small slabs of polycrystalline monomorphic barium titanate elements. A pair of opposite sides of each slab are silvered by covering the surfaces with a thin silver film as, for example, by flashing.

After flashing, conductive surfaces are prepared by covering the portions of the silver film to be removed with one or more masks and then covering the unmasked portions of the silver film with an inert material such as wax. The masks are removed and the masked portions of the silver film are then etched away by any of a number of well known etching processes. For example, the silvered sides of the element can be brushed with a solution of nitric acid or the whole element can be submerged in the acid whereby the silver film portions not covered by the wax will be dissolved. The wax is then cleaned from the conductive surfaces and lead wires are attached thereto by means of a silver-saturated tin-lead solder.

The motor portion of the memory element is then permanently polarized by applying a voltage signal to the conductive surfaces adjacent the motor element and by concurrently heating the memory element above its Curie temperature and then letting the element slowly cool down below its Curie temperature. For example, with the specific barium titanate material hereinbefore discussed, when a voltage of approximately 50 volts is applied to the conductive surfaces while the memory element is submerged in an oil bath at 140° C., the motor portion becomes permanently polarized.

The memory cell is then connected to external circuitry and the resonant frequency of the element checked. If the resonant frequency is not within the preselected range, the length or width or both of the memory element can be slightly modified to bring the resonant frequency within the preselected range. For example, air abrasion techniques can be used to etch or cut away small portions of the brittle barium titanate ceramic. An S. S. White air abrasion system has been found quite satisfactory for this purpose. Standardization of the resonant frequency is generally desired where the memory elements are to be fabricated into a memory element matrix.

It should be clear from the foregoing discussion that numerous alterations and modifications may be made in the invention without departing from the basic concepts of the invention as herein set forth. For example, the ferroelectric elements can be mechanized without any conductive surfaces positioned thereon, the ferroelectric elements being positioned adjacent but not in contact with external conductive surfaces which operate in the same fashion as the conductive surfaces positioned in contact with the ferroelectric elements as shown in FIG. 1. In addition, the motor portion of the memory element need not be permanently polarized. However, if the motor portion is unpolarized, it will be deformed in the same direction regardless of the polarity of the applied electric field. Hence, when a sinusoidal excitation signal is used, the frequency of the memory output will be double that of the excitation signal. Accordingly, it is to be expressly understood that the invention is to be limited only by the scope of appended claims.

What is claimed as new is:

1. In a non-destructive memory for storing bivalued bits of information, said combination comprising: a monomorphic ferroelectric element having first and second states of polarization, a first portion of said monomorphic ferroelectric element being permanently polarized in said first state; first means for selectively applying an electric field across the first portion of said ferroelectric element to physically deform said ferroelectric element; and a conductor positioned adjacent said ferroelectric element, said ferroelectric element being responsive to the application of the bivalued bits of information to said conductor to polarize the non-permanently polarized portion of said ferroelectric element to said first or second state, said ferroelectric element being responsive to said physical deformation to produce an output signal at said conductor representative of the state of polarization of the non-permanently polarized portion of said ferroelectric element.

2. The combination defined in claim 1 wherein said first means includes a pair of conductive surfaces positioned on opposite sides of said first portion of said ferroelectric element.

3. The combination defined in claim 2 wherein said first means further includes a potential source coupled to said conductive surfaces.

4. In a non-destructive memory for storing bivalued bits of information and for reproducing the stored bits upon excitation by an excitation signal, the combination comprising: a one piece ceramic element having first and second opposite sides and electrostrictive and ferroelectric properties; a pair of first and second conductive surfaces positioned on said first side of said element; and a third conductive surface positioned on said second side of said element, said element being responsive to the application of a bivalued bit of information to said second conductive surface to store said bivalued bit of information and to the application of the excitation signal to said first conductive surface to reproduce the stored bit of information at said second conductive surface, at least a portion of said ceramic element between said first and third conductive surfaces being permanently polarized in a preselected state.

5. The combination defined in claim 4 which includes an excitation signal source connected to said first and third conductive surfaces.

6. The combination defined in claim 5 which includes gating circuitry connected to said second conductive surface.

7. A non-destructive memory for storing bivalued bits of information, said memory comprising: a single ceramic element having two different polarization states, the state of polarization of at least a portion of said element representing the value of the stored information; a pair of first and second conductive surfaces positioned in contact with opposite sides of said ceramic element for applying an electric field across a portion of said ceramic element permanently polarized in one of said two different polarization states to physically deform said element whenever an electromotive potential is applied to said conductive surfaces, said ceramic element being responsive to the physical deformation for generating an output voltage representative of the value of the stored information.

8. In a non-destructive memory capable of storing first and second valued bits of information, said combination comprising: a monomorphic ceramic element having both electrostrictive and ferroelectric properties and being divided into first and second sections, each section having first and second levels of polarization, said first section being permanently polarized at said first level, the polarization of said second section being representative of the information stored by said ceramic element; an output conductor positioned adjacent said second section; and a pair of conductive surfaces positioned adjacent opposite sides of said first section for applying an electric field to said first section to physically deform said ceramic element, said ceramic element being responsive to said physical deformation to generate a signal at said output conductor representative of the state of polarization of said second section.

9. In a non-destructive memory for storing bivalued bits of information, said combination comprising a monomorphic ferroelectric element having first and second states of polarization, a first portion of said monomorphic ferroelectric element being permanently polarized in one of said first and second states of polarization; means for selectively applying an electric field across said first portion of said monomorphic ferroelectric element to physically deform said monomorphic ferroelectric element; and means for sensing the state of polarization of a second portion of said monomorphic ferroelectric element, said ferroelectric element being responsive to the application of bivalued bits of information to polarize said second portion of said ferroelectric element to said first or second state and being responsive to physical deformation to produce an output signal representative of the state of polarization of said second portion of said ferroelectric element.

References Cited in the file of this patent

UNITED STATES PATENTS

| | | |
|---|---|---|
| 2,357,932 | Crosby | Sept. 12, 1944 |
| 2,671,950 | Sukacev | Mar. 16, 1954 |
| 2,711,515 | Mason | July 21, 1955 |
| 2,717,372 | Anderson | Sept. 6, 1955 |
| 2,782,397 | Young | Feb. 19, 1957 |
| 2,961,745 | Smith | Nov. 29, 1960 |
| 3,037,196 | Brennemann | May 29, 1962 |
| 3,042,904 | Brennemann | July 3, 1962 |